(12) United States Patent
Brown et al.

(10) Patent No.: US 6,397,225 B1
(45) Date of Patent: May 28, 2002

(54) MESSAGING SYSTEM WITH PROTOCOL INDEPENDENT MESSAGE FORMAT

(75) Inventors: Russell C. Brown; Donald C. Likes, both of Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/220,149

(22) Filed: Dec. 23, 1998

(51) Int. Cl.⁷ .............................................. G06F 17/30
(52) U.S. Cl. .................................................. 707/104.1
(58) Field of Search ..................................... 707/104.1

(56) References Cited

U.S. PATENT DOCUMENTS

| | | | | |
|---|---|---|---|---|
| 4,945,471 A | * | 7/1990 | Neches | 340/825.02 |
| 4,949,239 A | * | 8/1990 | Gillett et al. | 710/108 |
| 5,583,487 A | * | 12/1996 | Ackerman et al. | 235/383 |
| 5,761,083 A | * | 6/1998 | Brown, Jr. et al. | 364/528.31 |
| 5,987,633 A | * | 11/1999 | Newman et al. | 714/712 |
| 6,064,816 A | * | 5/2000 | Parthasarathy et al. | 395/704 |
| 6,073,174 A | * | 6/2000 | Montgomerie et al. | 709/224 |
| 6,167,406 A | * | 12/2000 | Hoskins et al. | 707/102 |
| 6,182,252 B1 | * | 1/2001 | Wong et al. | 714/708 |
| 6,192,282 B1 | * | 2/2001 | Smith et al. | 700/19 |
| 6,198,480 B1 | * | 3/2001 | Cotugno et al. | 345/333 |

* cited by examiner

Primary Examiner—Wayne Amsbury
(74) Attorney, Agent, or Firm—Williams, Morgan & Amerson, P.C.

(57) ABSTRACT

A messaging system includes a message bus and a first processing device. The message bus is adapted to transmit a first message. The first message includes a second message, and the second message includes at least a first command. The first processing device is coupled to the message bus. The first processing device includes a message interface adapted to receive the first message and extract the second message independent of the first command. An input queue is adapted to store the second message. A message interpreter is adapted to retrieve the second message from the message queue and decode the second message to identify the first command. A method for communicating messages includes transmitting a first message over a message bus. The first message includes a second message, and the second message includes at least a first command. The first message is received and the second message is extracted independent of the first command. The second message is stored in an input queue. The second message is retrieved from the message queue. The second message is decoded to identify the first command.

15 Claims, 4 Drawing Sheets

| Program Variable 405 | Database Column Name 410 | Variable Type 415 |
|---|---|---|
| hasTurbo | hasturbo | 101 (Boolean) |
| when_needed | whenneeded | 10 (date) |
| picture | picture | 11 (BLOB) |
| ... | ... | ... |
| carAvailable | caravailable | 101 (Boolean) |
| shipDate | shipdate | 10 (date) |

Figure 4

MESSAGING SYSTEM WITH PROTOCOL INDEPENDENT MESSAGE FORMAT

BACKGROUND OF THE INVENTION

1. Field of the Invention

This invention relates generally to automation control systems, and, more particularly, to a messaging system having a protocol independent message format.

2. Description of the Related Art

Many manufacturing facilities have installed automated systems for controlling the manufacture of products. These control systems typically include a network of computers, or other processing devices, that connect various components of the system (e.g., processing equipment, records control equipment, product flow equipment, etc.). Usually the control system is implemented using software written for computers implementing UNIX or Microsoft Windows® NT that communicate over a Transmission Control Protocol/Internet Protocol (TCP/IP) network.

The control system software allows various components on the system to interact in accordance with the system protocol. An exemplary messaging product for providing such an exchange is the ISIS system offered by Stratus Computer, Inc. Generally, the ISIS system provides a message bus for use in information exchange. One or more pieces of equipment may be coupled to the message bus. An equipment interface (i.e., a computer executing interface software) communicates with the message bus and generates ISIS compatible messages for transmission to other devices. Available messaging systems, such as the ISIS system, sometimes use non-preemptive, ping-based communication protocols. If the message bus checks the availability of a piece of equipment (i.e., pings the equipment), and the equipment interface fails to respond, the device is disconnected from the message bus. A disconnection problem is also encountered by other programs, such as 16-bit Windows® programs handling context switches and user input.

Typically, one or more servers are coupled to the message bus for storing and retrieving information, such as tracking information, manufacturing information, and the like. The servers are coupled to relational databases for storing and retrieving the data. Relational database transactions are inherently atomic, in that they cannot be broken down into smaller transactions for completion. In some cases, a database transaction may take a long time to complete due to the size of the database being accessed. During this access time, the message bus may ping the device database application, which cannot respond due to the pending transaction. In such a case, the application may be disconnected from the bus and thus be unavailable for future access.

One technique for addressing the latency problem involves using a front end application on the server to receive a message, decode the message (i.e., also known as parsing the message), and enqueue the message. A database interface portion of the server software retrieves messages from the queue and executes the instructions therein as resources are available. The front end application maintains communication with the message bus, so the server is not disconnected while retrieving the data. This technique has several limitations.

Typically, accesses to the server include database column name information. The front end application parses the message to extract the command and column name information to verify that the command is acceptable to the database interface (e.g., proper format, necessary fields are present, etc.). Both the front end application and the database interface must know the structure of the database to properly address the instruction. Changes in the database structure require reprogramming of both the front end application and the database interface.

Another limitation lies in the fact that programming names used to reference variables often do not mirror the column names of the database. For example, programming names often include mixed-case characters and/or special characters (e.g., wafer_Id). Typically database column names referenced by the database are not case sensitive and cannot include some special characters. Also, the results are returned from the database in lower case (e.g., waferid). To address this problem, the front end application and the database interface must be hard coded to translate the program names to column names for accessing the database (e.g., wafer_Id=waferid), and must also translate the column names provided in the results of the database transaction back into program names that can be transferred back to the requesting device (e.g., waferid=wafer_Id).

Using the two process architecture described above (i.e., front end application and database interface) to address the latency problem creates a code maintenance problem. Both the front end application and the database interface must be reprogrammed in response to changes in the database structure or column names (e.g., addition of a new column to the database). If other devices on the message bus access the database, they must also be recoded in response to database changes. The code is not portable, in that unique code must be created for each type of equipment being serviced. For example, if a different device is added to the network a custom front end application specific to the new device must be created.

The present invention is directed to overcoming, or at least reducing the effects of, one or more of the problems set forth above.

SUMMARY OF THE INVENTION

One aspect of the present invention is seen in a messaging system including a message bus and a first processing device. The message bus is adapted to transmit a first message. The first message includes a second message, and the second message includes at least a first command. The first processing device is coupled to the message bus. The first processing device includes a message interface adapted to receive the first message and extract the second message independent of the first command. An input queue is adapted to store the second message. A message interpreter is adapted to retrieve the second message from the message queue and decode the second message to identify the first command.

Another aspect of the present invention is seen in a method for communicating messages the method includes transmitting a first message over a message bus. The first message includes a second message, and the second message includes at least a first command. The first message is received and the second message is extracted independent of the first command. The second message is stored in an input queue. The second message is retrieved from the message queue. The second message is decoded to identify the first command.

BRIEF DESCRIPTION OF THE DRAWINGS

The invention may be best understood by reference to the following description taken in conjunction with the accompanying drawings, in which like reference numerals identify like elements, and in which:

FIG. 4 is a diagram illustrating an alias table used by the information server of FIG. 2.

Figure 1:
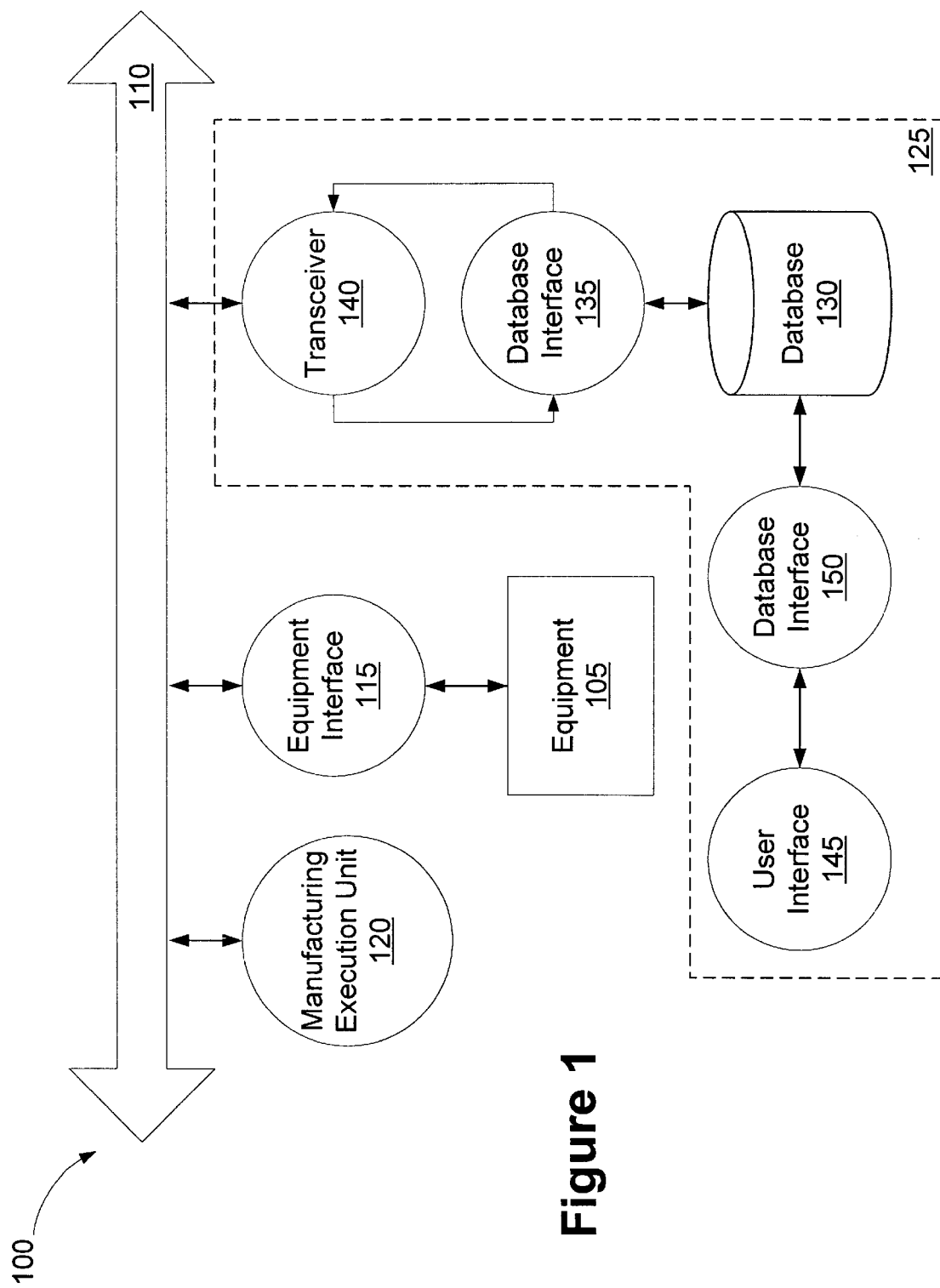
FIG. 1 is a simplified block diagram of a factory system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of a factory system 100. In the illustrated embodiment, the factory system 100 is implemented in a semiconductor manufacturing facility. Various pieces of manufacturing equipment 105 (for clarity, only one is shown) are coupled to a message bus 110 for exchanging information. For example, the manufacturing equipment 105 may be an oven for baking semiconductor wafers, a wafer sorter, or some other piece of equipment. The manufacturing equipment 105 is coupled to an equipment interface 115 for interfacing with the message bus 110.

Generally, the equipment interface 115 is a software program running on a computer (not shown) that is coupled to the manufacturing equipment 105 through a physical connection. The equipment interface 115 presents a consistent interface to the message bus 110, independent of the particular function of the manufacturing equipment 105. The equipment interface 115 translates the protocol of the manufacturing equipment 105 to a format compatible with other devices (not shown) on the message bus 110. Thus, other devices in the factory system 100 need not necessarily know the specific protocol of the manufacturing equipment 105.

The factory system 100 also includes a manufacturing execution unit 120. In the illustrated embodiment, the manufacturing execution unit 120 is a software application entitled WorkStream™, sold by the Consilium Corporation. The primary function of the manufacturing execution unit 120 is to perform work-in-progress tracking of lots of wafers. Each wafer is eventually sliced into a number of chips. The manufacturing execution unit 120 tracks the location of each lot and records the processing steps that have been completed. The manufacturing execution unit 120 also determines what steps are needed to complete the wafer and determines the route by which the processing is to be completed.

The factory system 100 includes an information server 125 for storing work in progress information. In the illustrated embodiment, the information server 125 is a wafer identification system (WIDS), which is a server that interfaces with the equipment interfaces 115 to track the status and location of various wafers under production. In the illustrated embodiment, the information server 125 is a computer (not shown) having a processor (not shown) executing software stored on a program storage device (not shown) (e.g., hard disk, memory device, etc.) to perform the functions described below. The information server 125 includes a database 130 for storing status information regarding the wafers. A database interface 135 accesses the database 130 using standard database commands such as structured query language (SQL) commands, which are well known to those of ordinary skill in the art. A transceiver 140 is coupled between the message bus 110 and the database interface 135 for retrieving messages 300 (shown in FIG. 3) destined for the information server 125. The format of the messages 300 retrieved by the transceiver 140 and the overall operation of the information server 125 are described in greater detail below in reference to FIG. 4. It is contemplated that a second redundant transceiver (not shown) and a corresponding redundant database interface (not shown) may be coupled between the message bus 110 and the database 130 to allow a second path for accessing the information server 125 in the event that the transceiver 140 is disconnected or ceases to function properly, or if the database interface 135 ceases to function properly.

A user interface 145 is provided to allow a user to directly enter the messages 300 from a command prompt to access the database 130 through a second database interface 150. The second database interface 150 may be combined with the first database interface 135 and configured to accept either user input or input from the transceiver 140. The user may enter the messages 300 from the command prompt to test the operation of the information server 125 or to manually retrieve data therefrom. The user may enter messages 300 manually or by using a script. The information server 125 may be implemented with or without the user interface 145.

Figure 2:
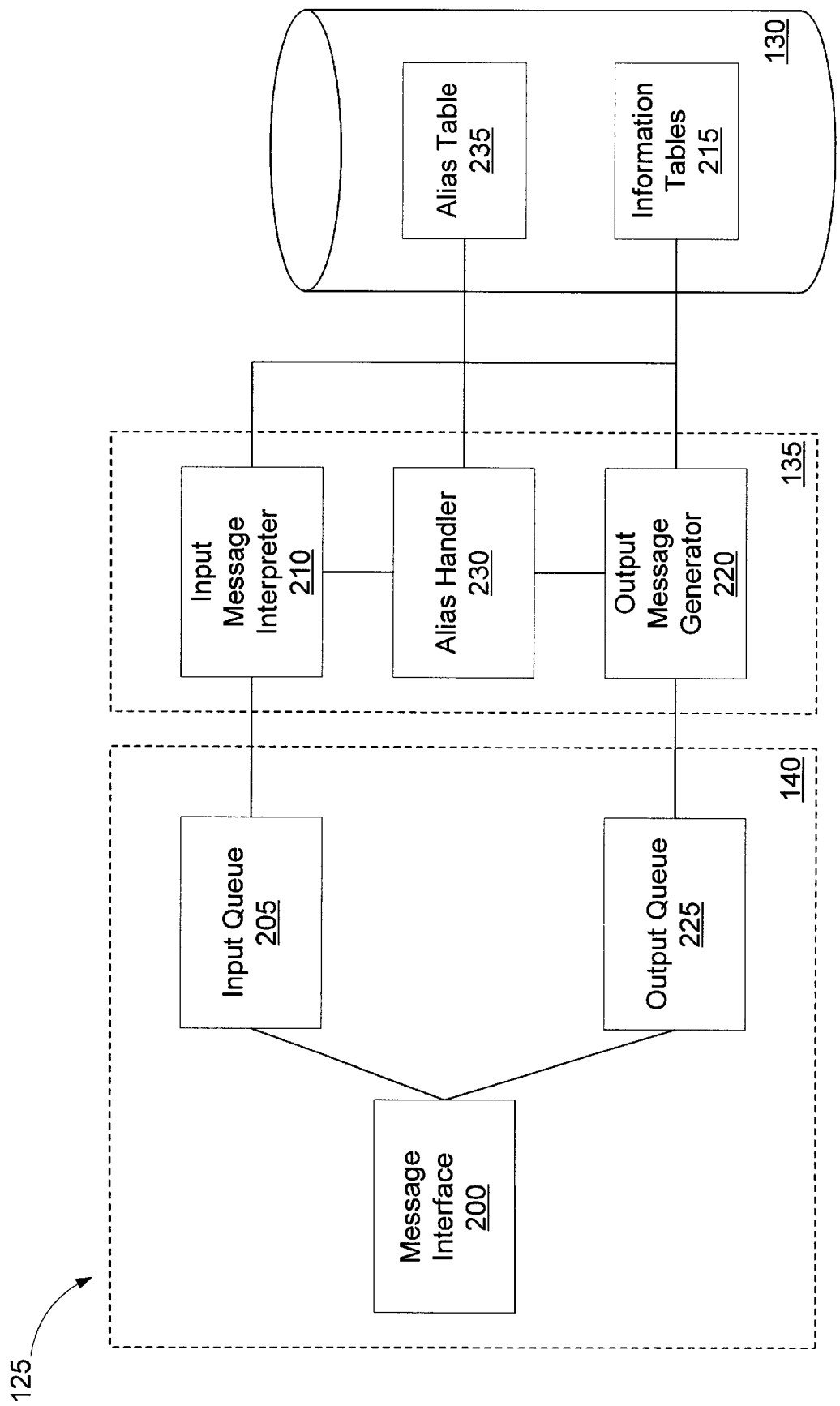
FIG. 2 is a simplified block diagram of an information server in the factory system of FIG. 1.

Turning now to FIG. 2, a simplified block diagram of the information server 125 is provided. The transceiver 140 includes a message interface 200 for retrieving the messages 300 on the message bus 110. In the illustrated embodiment, the message 300 comprises a text based message composed of ASCII characters. As is known to those of ordinary skill in the art, a text message may be encapsulated using a number of known messaging protocols, such as, ISIS. The message interface 200 is programmed in accordance with the protocol of the message bus 110 to identify and receive the messages 300 destined for the information server 125. The message bus 110 need not be aware of the content of the message 300, but is only required to know its destination (e.g., the information server 125).

After retrieving the message 300, the message interface 200 places the message in an input queue 205. The message 300 is read from the input queue 205 by the database interface 135 as resources permit. This permits the message interface 200 to respond to periodic pings from the message bus 110 while the database interface 135 executes the command contained within the message 300, thus preventing the information server 125 from being disconnected from the message bus 110.

The database interface 135 includes an input message interpreter 210 that retrieves the messages 300 from the input queue 205, decodes the command contained therein, and accesses the database 130 based on the command. Prior to the decoding performed by the input message interpreter 210, the actual content of the message 300 need not be determined. Thus, only the input message interpreter 210 requires re-coding in the event of a command or database structure change.

Figure 3:
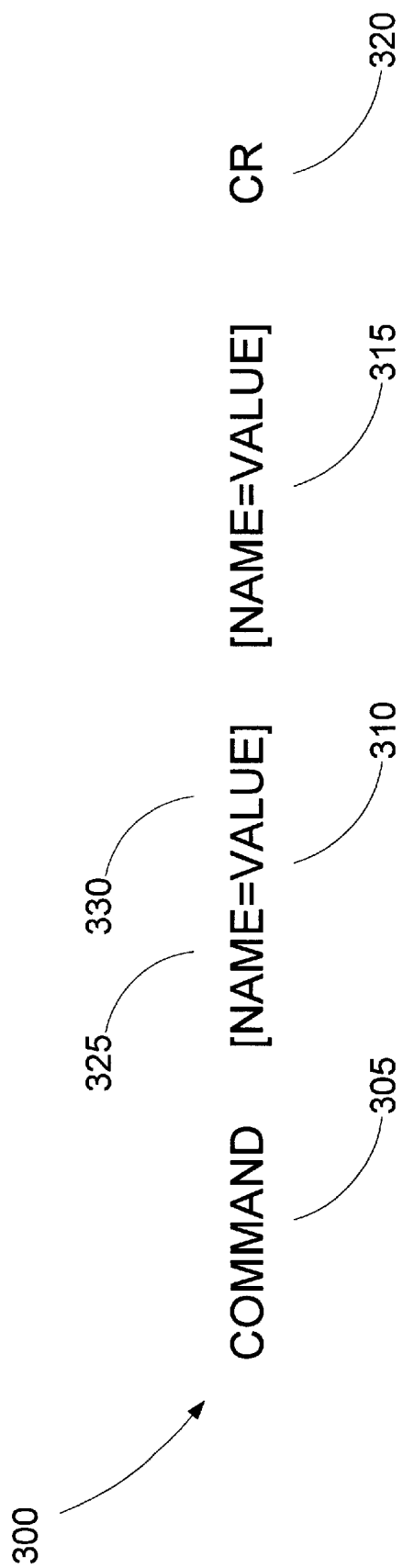
FIG. 3 is a diagram illustrating the construct of a message used in the factory system of FIG. 1.

The construct of the text-based message 300 is now described in greater detail in reference to FIG. 3. In general, the message 300 includes a command 305 followed by a series of name-value pairs 310 and a terminator 320. Each name-value pair 310 includes a variable name 325 and a corresponding value 330. In the illustrated embodiment, the terminator 320 is a carriage return. The variable name 325 may be mixed-case and may include certain special characters, such as "!", "$", or "_", for example. The value 330 includes a delimiter, where applicable, to define the type of the variable name 325. For example, in the value 330, a number without a decimal point denotes an integer, a number with a decimal point denotes a floating point value, and a number with an "e" (i.e., among other characters delineated below) designates an exponential number. A series of characters enclosed in quotes designates a string, a number preceded by an "@" sign designates a datetime variable, and words without quotes, such as true or nil (i.e., among other key words delineated below), denote Boolean and empty variables, respectively. A binary large object (blob) is designated by the number of characters in the blob enclosed in square brackets, followed by the characters (e.g., [4]@#q$).

Because the type of the variable 325 may be derived directly from the format of the value 330, the variable may be exchanged readily. Also, because the command's variable names 325 and values 330 are expressed in text characters, the message 300 is easily understood by a person reading the message 300. Accordingly, errors in the message 300 are readily identified, and it is easy to determine the content of the last message 300 received by the information server 135 in the case of a failure. In the case of prior art messaging techniques that use complex binary formats it is extremely difficult, if not impossible, to discern the content of a particular message. The text format also simplifies the task of the programmer encoding the message 300, in that complicated binary data formats are not required to be used.

Table 1 illustrates the expansion of the message 300 in Backus-Naur form. Some large terminals are not expanded where their meaning is clear. A backslash precedes a character that should be taken literally.

TABLE 1

```
message::={word_delimiter} command_message | comment_message
comment_message::="#" {anychar_except_terminator} terminator
command_message::=command [{word_delimiter}
{nvpair word_delimiter}] terminator
terminator::=" "
command::=namechar {namechar}
word_delimiter::="space"|"tab"
namechar::="a"|"b"|..."z"|"A"|"B"|...|
"Z"|"0"|"1"|...|"9"|"!"|"$"|"_"
nvpair::=name pair_delimiter value
name::=namechar {namechar}
pair_delimiter::="="
value::=string_value | int_value | float_value |
enum_value | datetime_value | blob_value
string_value::="[|]P'" {string_char} "[|]P'"
string_char::=anychar_except_quote|escaped_quote
escaped_quote::="[|]P'[|]P'"
int_value::={sign}{int_chars}
sign::=["+"|"−"]
int_chars::="0"|"1"|"2"|"3"|"4"|"5"|
```

TABLE 1-continued

```
"6"|"7"|"9"
float_value::={int_chars} separator {int_chars}
separator::="."|exponent_separator
exponent_separator::=exponent_character sign
exponent_character::="e"|"E"|"d"|"D"
enum_value::=bool_value|nil_value
bool_value::=true_value|false_value
true_value::="t"|"T"|"true"|"TRUE"|
"True"|"y"|"yes"|"YES"|"Yes"
false_value::="f"|"F"|"false"|"FALSE"|
"False"|"n"|"no"|"NO"|"No"
nil_value::="nil"|"nothing"|"null"|"nul"|
"na"|"n/a"|"empty"
datetime_value::="@" year month day hour minute second
year::=int_char int_char int_char int_char
month::=int_char int_char
day::=int_char int_char
hour::=int_char int_char
minute::=int_char int_char
second::=int_char int_char
blob_value::="[" {size} "]" any_bytes
size::={int_char}
```

To better understand the usefulness of the message structure, an illustrative example of a message is "buycar wheels=4 color="green" liters=3.1 hasTurbo=true when_needed=@19980910093126 insurance=nil picture=[4]m!-/". The command to be executed is "buycar". The variable types defined by the message construct are: "wheels" is an integer; "color" is a string; "liters" is a floating point value; "hasTurbo" is a Boolean variable; "when_needed" is a datetime variable; "insurance" has an empty value; and "picture" is a binary large object having 4 characters.

Returning to FIG. 2, the input message interpreter 210 retrieves the message 300 and decodes the command 305 to generate a database access command. In the illustrated embodiment, the input message interpreter 210 generates a structured query language (SQL) command for accessing information tables 215 in the database 130. The results of the database access command are received by an output message generator 220, and a reply message is generated in the format described above. The reply message is stored in an output queue 225 of the transceiver 140. The message interface 200 retrieves the reply message from the output queue 225 and transmits it on the message bus 110 when resources are available. Because the reply message is generated independent of the transceiver 140, the transceiver 140 may remain in contact with the message bus 110 to prevent the information server 125 from being disconnected.

A known problem in the art relates to translating between program variable names, which may contain mixed-case and/or special characters, and database column names, which typically are not case sensitive and cannot contain special characters. To avoid hard coding of the relationship between the program names and the database column names, the database interface 135 includes an alias handler 230 that accesses an alias table 235 in the database 130 to identify these relationships.

When interpreting the message, the input message interpreter 210 passes the program variable names to the alias handler 230. FIG. 4 illustrates exemplary alias table entries 400. The alias handler 230 accesses the alias table 235 based on a program variable name 405 to identify a column name 410 corresponding to the program variable name 405. Each alias table entry 400 also includes a variable type field 415 indicating the type of the program variable. Table 2 illustrates exemplary values for the variable type field 415 and the corresponding variable type. In the illustrated example, a sample of the program variable names 405 used in the "buycar" command described above is described.

TABLE 2

| | |
|---|---|
| String | 1 |
| Integer | 4 |
| Float | 6 |
| Datetime | 10 |
| BLOB | 11 |
| Boolean | 101 |

The "hasTurbo" program variable name 405 has a corresponding column name 410 of "hasturbo" (i.e., lower case) and a variable type field 415 of 101 (i.e., Boolean). The "when_needed" program variable name 405 has a corresponding column name 410 of "whenneeded" (i.e., lower case, no special character) and a variable type field 415 of 10 (i.e., datetime). Finally, the "picture" program variable name 405 has a corresponding column name 410 of picture and a variable type field 415 of 11 (i.e., BLOB).

It is contemplated that program variable names 405 having identical column names 410 (e.g., "picture") may be omitted from the alias table 235 if desired. If no corresponding column name 410 for a program variable name 405 is identified, the program variable name 405 may be used to construct the database access command. However, as described below, in some cases the variable type field 415 may be needed for generating a reply message, even if the program variable name 405 and the column name 410 match.

Typically, Boolean variables are stored in the database 130 as integers (e.g., 1=true, 0=false), or as strings (e.g., "Y" or "true"=true, "N" or "false"=false). It is not apparent within the context of the database 130 whether a field is an integer, string, or Boolean, so the user of the database 130 must know if a field is Boolean and the format of the data. For example, if the information table 215 in the database 130 were queried to determine the column names, the returned information would include a "hasturbo" column name having a type of integer. The alias table 235 provides the information used to determine that the "hasturbo" column name 310 corresponds to the "hasTurbo" program variable name 305, and that the data is Boolean. This information is useful in constructing reply messages based on queries to the database 130.

When the incoming message 300 is decoded to identify the command, the value 330 for a Boolean variable 325 may have various values (e.g., true, Y, yes, false, f, no, etc.) as shown in Table 1. Also, empty values 330 may have a number of forms (e.g., nil, nul, etc.). when generating a reply message, one of the choices may be selected as a default expression (e.g., true, false, nil).

An exemplary reply message to the "buycar" command is "buycar err=0 errText="SUCCESS" carAvailable=true shipDate=@19980825120000". Consider that the information table 215 contains a list of available cars and their features. The input message interpreter 210 constructs a SQL command to match the cars in the information table 215. The results of the query indicate that a car matching the requirements is available (e.g., carAvailable) and provides the shipping date (e.g., shipDate). The alias table 235 provides the translations and variable types needed to access the information server 125 as shown in FIG. 4.

When constructing the reply message, the output message handler 220 receives the integer value (e.g., 1) stored in the caravailable field and generate the "carAvailable=true" name-value pair in the replay message based input from the alias handler 230. Notice that the "err" and "errText" terms were included in the reply message to indicate that the query was successful. Specific error messages and codes may be developed to indicate message format problems or missing information.

To illustrate the operation of the information server 125 as may be used in a semiconductor fabrication facility, an additional example is provided. Typically, a lot of wafers is stored in a cassette during the fabrication process. A cassette is a plastic box with parallel slots for holding the wafers. The cassette is the primary unit of processing in the fabrication facility, and a lot is frequently analogous to a cassette. Among other things, the information server 125 reports the slot in a cassette a wafer can be found.

In many cases, the behavior of the equipment 105 is assessed by measuring a physical quality of the wafers before they are processed by the equipment 105 and measuring the same quality of the wafers after they have been processed by the equipment 105. One function of the information server 125 is to ensure that the same wafers measured in the preprocess metrology step are measured again in the postprocess metrology step. For purposes of this example, the equipment 105 is a wafer sorter capable of lifting particular wafers out of a cassette and identifying them. When a cassette is placed on the wafer sorter 105 before a postprocess metrology step, the wafer sorter 105 that should determine what slots of the cassette must be accessed to perform the metrology.

The wafer sorter 105 sends a message thorough its message interface 200 to identify a "mark" made at the preprocess metrology step for the lot to which the wafer belongs. The mark is stored in an information table 215 in the database 130. The name of the information table 215 for this example is "wids_lot." The information table 215 includes: a "lotnumber" field specifying the unique ID of a lot of interest; an "operation" field indicating the particular step being performed on the wafers in the lot in the manufacturing cycle; a "marktype" field, which is blank for an ordinary preprocess metrology mark; a "waferid" field representing the physical vendor scribe on the wafer; and a "slotnumber" field indicating the position of the wafer in the cassette when the mark was made.

One record exists in the "wids_lot" table 215 for each wafer that was marked. The wafer sorter 105 sends a message thorough its message interface 200 to the information server 125 to finds the marks by sending the following request: getWaferIds lotNumber="J836020" operation= "2270". The message interface 200 receives the message in ISIS format and extracts the text-based message. The message is stored in the input queue 205. The input message interpreter 210 retrieves the message and constructs an SQL query having the format:

SELECT lotnumber, operation, marktype, waferid, slotnumber
    FROM wids_lot
    WHERE lotnumber='J836020'
      AND operation='2270'

The input message interpreter 210 cooperates with the alias handler 230 as described above to identify the column names 410 corresponding to the program variable name 405 in the message. Based on the SQL query, the database 130 returns a list of marks that were made at the 2270 operation. Table 3 illustrates exemplary results for the query.

TABLE 3

| lotnumber | operation | marktype | waferid | slotnumber |
|---|---|---|---|---|
| J836020 | 2270 | [blank] | 4CX4583H | 1 |
| J836020 | 2270 | [blank] | 4CT4612J | 5 |
| J836020 | 2270 | [blank] | 4MM4755K | 10 |

The output message generator 220 receives the results and cooperates with the alias handler 230 to generate the reply message:

getWaferIds err=0 errTxt="SUCCESS" lotNumber= "J836020" operation="2270" markType=" " waferId= "4CX4583H" slotNumber=1 lotNumber="J836020" operation="2270" markType=" " waferId="4CT4612J" slotNumber=5 lotNumber="J836020" operation= "2270" markType=" " waferId="4MM4755K" slotNumber=10

Notice that the column names 410 are translated back to mixed case program variable names 405 as required by the equipment interface 115. The output message generator constructs the reply message, and places it into the output queue 225. The message interface 200 encapsulates the reply message in accordance with the protocol of the message bus 110 (e.g., ISIS), and the message bus 110 transfers the encapsulated reply message to the equipment interface 115. The equipment interface 115 extracts the reply message and takes whatever actions are required, depending on the specific function being performed.

The general technique described herein for isolating the information server 125 from the message bus 110 to prevent disconnection is not limited in its application to only the information server 125. It is contemplated that any device (not shown) that takes a significant amount of time to generate a reply message may take advantage of the two-level architecture to avert disconnections from the message bus 110. Because the transceiver 140 is not required to know the content of the message, it is portable and may be used with any device (not shown). The database interface 135 is only one example of a device for interfacing with the transceiver 140. The independence of the transceiver 140 from the database interface 135 is advantageous, in that the transceiver 140 can be used in any application without being reprogrammed.

If desired, the transceiver 140 may be adapted to verify the syntax of the message 300 independent of the particular command 305. In such a case, the message interface 200 checks the message 300 to verify that the rules described in Table 1 are satisfied. For example, the message interface 200 checks if the message does contain the command 305 and that any name-value pairs 310 have acceptable formats that define their data type.

It is also contemplated that the use of the alias table 235 to store information about relationships between program variable names 405 and column names 410 may be implemented in other applications other than in conjunction with the factory system 100 described herein.

Also, the technique for representing various data types using the text based message 300 described herein may be adapted for various applications to generate the messages 300 that are readily programmed, readily understood, and independent of any messaging protocol, such as ISIS. Thus, if the protocol of the message bus 110 is changed, only the software related to the encapsulation of the message 300 by the equipment interface 115 or the transceiver 140 need be modified. The other elements are unaffected.

The high degree of protocol independence possible with the factory system 100 described herein provides great flexibility and lowers the cost of system maintenance. The internal protocols of the equipment 105, information servers 125, or other devices may be changed without changing the operation of the message bus 110, the equipment interface 115, or the transceiver 140. Likewise, the protocol of the message bus 110 may be changed without impacting the equipment 105 or the information server 125.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A messaging system, comprising:
    a plurality of processing devices, wherein a first one of the processing devices is adapted to generate a first message including a first command destined for a second one of the processing devices; and
    a message bus coupled to the plurality of processing devices and being adapted to receive the first message, generate a second message including the first message, and transmit the second message to the second one of the processing devices, the message bus being further adapted to periodically transmit availability requests to the plurality of processing devices to determine their availability;
    wherein the second processing device comprises:
        an input queue;
        a message interface adapted to receive the second message, extract the first message, store the first message in the input queue, and respond to the periodic availability requests; and
        a message interpreter adapted to retrieve the first message from the message queue and decode the first message to identify the first command; and
        an executor adapted to process the first command, and the message interface is further adapted to respond to the periodic availability requests while the executor processes the first command independent of the responding to the periodic availability requests.

2. The system of claim 1, wherein the executor further comprises a database.

3. The system of claim 1, wherein the message interpreter is further adapted to generate a database access command for accessing the database based on the first command.

4. The system of claim 3, wherein the database access command comprises a structured query language command.

5. The system of claim 3, wherein the database is adapted to provide a resultant corresponding to the database access command, and the first processing device includes an output message generator adapted to generate a reply message based on the resultant.

6. The system of claim 5, wherein the first processing device includes an output queue adapted to receive the reply message, and the message interface is adapted to retrieve the reply message from the output queue and generate a third message including the reply message.

7. The system of claim 6, wherein the message interface is adapted to transmit the third message on the message bus.

8. A messaging system, comprising:
    a plurality of processing devices, wherein a first one of the processing devices is adapted to generate a first message including a first command destined for a second one of the processing devices; and a message bus coupled to the plurality of processing devices and being adapted to receive the first message, generate a second message including the first message, and transmit the second message to the second one of the processing devices, the message bus being further adapted to periodically transmit availability requests to the plurality of processing devices to determine their availability;

wherein the second processing device comprises:
an input queue;
a message interface adapted to receive the second message, extract the first message, store the first message in the input queue, and respond to the periodic availability requests;
a message interpreter adapted to retrieve the first message from the message queue and decode the first message to identify the first command; and
a database adapted to receive the first command from the message queue and execute the first command independent of the responding to the periodic availability requests.

9. A method for communicating messages, comprising:
providing a plurality of processing devices coupled to a message bus;
generating a first message including a first command destined for a selected one of the processing devices;
generating a second message including the first message;
transmitting the second message on the message bus;
periodically transmitting availability requests to the plurality of processing devices on the message bus to determine their availability;
receiving the second message at the selected one of the processing devices;
extracting the first message from the second message;
decoding the first message to identify the first command;
executing the first command; and
responding to the availability requests during the executing of the first command independent of the executing.

10. The method of claim 9, wherein decoding the first message further comprises decoding a database access command.

11. The method of claim 10, wherein decoding the first message further comprises generating a structured query language command.

12. The method of claim 10, further comprising:
providing a resultant corresponding to the database access command; and
generating a reply message based on the resultant.

13. The method of claim 12, further comprising:
generating a third message including the reply message; and
transmitting the third message on the message bus.

14. A method for communicating messages, comprising:
providing a plurality of processing devices coupled to a message bus, at least one of the plurality of processing devices including a database;
generating a first message including a first command for accessing the database;
generating a second message including the first message;
transmitting the second message on the message bus;
periodically transmitting availability requests to the plurality of processing devices on the message bus to determine their availability;
receiving the second message at the one of the processing devices including the database;
extracting the first message from the second message;
decoding the first message to identify the first command;
executing the first command; and
responding to the availability requests during the executing of the first command, independent of the executing of the first command.

15. A method for communicating messages, comprising:
means for generating a first message including a first command destined for one of a plurality of processing devices coupled to a message bus;
means for generating a second message including the first message;
means for transmitting the second message on the message bus;
means for periodically transmitting availability requests to the plurality of processing devices on the message bus to determine their availability;
means for receiving the second message at the one of the processing devices;
means for extracting the first message from the second message;
means for decoding the first message to identify the first command;
means for executing the first command; and
means for responding to the availability requests during the executing of the first command independent of the executing.

* * * * *